United States Patent [19]

Hodgkins

[11] Patent Number: 5,197,443

[45] Date of Patent: Mar. 30, 1993

[54] FUEL SYSTEM FOR DIESEL TRUCK

[75] Inventor: David H. Hodgkins, Modesto, Calif.

[73] Assignee: Parker Hannifin Corporation, Cleveland, Ohio

[21] Appl. No.: 714,959

[22] Filed: Jun. 13, 1991

[51] Int. Cl.[5] .................................... F02M 37/04
[52] U.S. Cl. ..................................... 123/514; 123/510; 337/256; 180/314
[58] Field of Search ................. 180/314; 123/179.11, 123/557, 514, 510; 137/256

[56] References Cited

U.S. PATENT DOCUMENTS

| | | | |
|---|---|---|---|
| 636,610 | 11/1899 | Adams | 137/256 |
| 1,149,661 | 8/1915 | McCarthy | 123/179.11 |
| 1,189,096 | 6/1916 | Grunwald | 123/514 |
| 1,327,430 | 1/1920 | Honold et al. | 123/179.11 |
| 2,557,438 | 6/1951 | Johnson | 137/256 |
| 3,177,920 | 4/1965 | Phillips | 123/179.11 |
| 3,233,652 | 2/1966 | Phillips | 123/179.11 |
| 3,279,522 | 10/1966 | Norris | 137/256 |
| 3,699,995 | 10/1972 | Brandt | 137/256 |
| 4,385,615 | 5/1983 | Keane | 123/514 |
| 4,452,213 | 6/1984 | Duprez | 123/514 |
| 4,582,039 | 4/1986 | Nishida | 123/510 |
| 4,620,568 | 11/1986 | Somerford | 180/314 |
| 4,809,666 | 3/1989 | Baltz | 123/510 |
| 4,838,307 | 6/1989 | Sasaki | 123/514 |
| 4,932,609 | 6/1990 | Secchiaroli | 137/256 |
| 5,085,198 | 2/1992 | Bartlett | 123/514 |

FOREIGN PATENT DOCUMENTS

| | | | |
|---|---|---|---|
| 0239448 | 9/1987 | European Pat. Off. | 180/314 |
| 0150828 | 7/1986 | Japan | 180/314 |
| 0001633 | 1/1987 | Japan | 180/314 |

*Primary Examiner*—Carl S. Miller
*Attorney, Agent, or Firm*—Ralph E. Jocke

[57] ABSTRACT

A fuel system for a diesel truck has a first fuel tank (80) and a second fuel tank (82). A siphon line (90) is open to the lower portions of the tanks and extends above the upper portions of both tanks. A manually operated priming pump (98) is used to remove air from the siphon line. Fuel is delivered from the first tank to the engine of the truck through a fluid delivery line (84). As fuel is drawn from the first tank, the fuel levels in the tanks equalize as the result of flow through the siphon line. Fuel not consumed by the engine is returned through an overflow line (86). The returning fuel is warmed as a result absorbing energy during pumping and having been in close proximity to the engine. A three-way control valve (88) directs the warm returning fuel to either the first or second fuel tank in response to the temperature sensed by a temperature sensor (94). In winter, the system operates to keep the fuel delivered from the first tank to the engine warm, and in summer prevents the fuel from becoming too hot.

17 Claims, 7 Drawing Sheets

FUEL SYSTEM FOR DIESEL TRUCK

This invention relates to a fuel systems for vehicles. Particularly, this invention relates to a fuel system for a diesel powered over the road truck.

BACKGROUND ART

Figure 1:
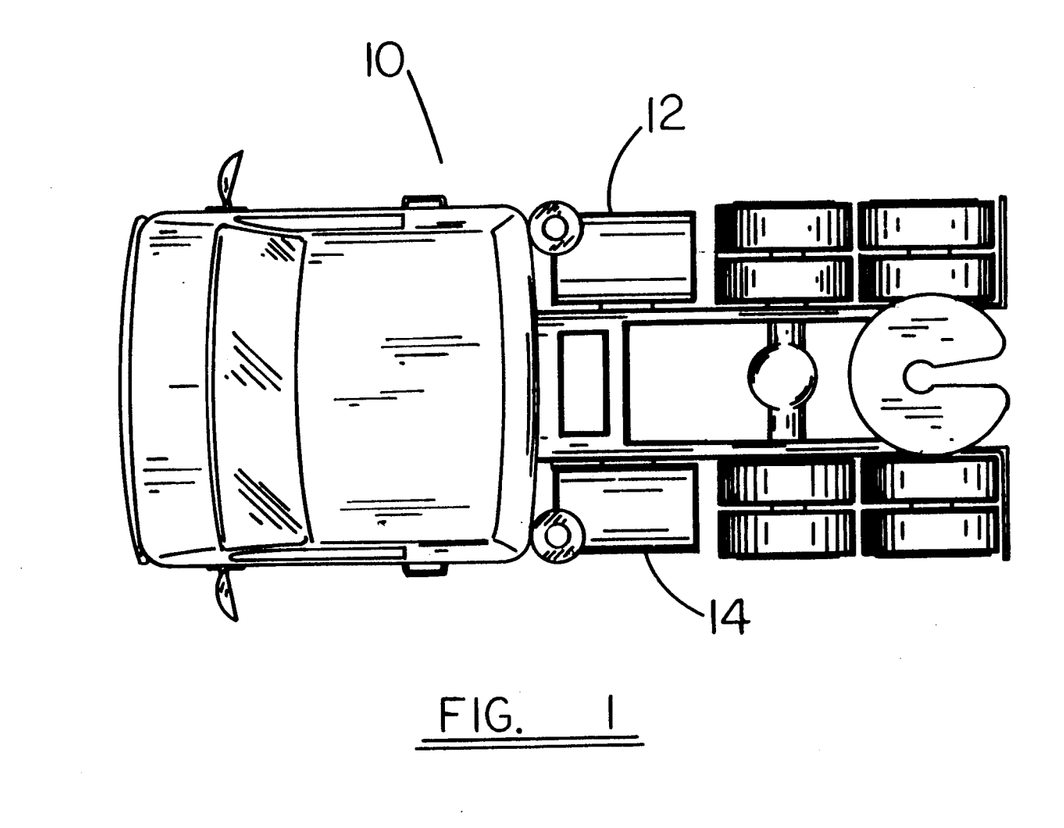
FIG. 1 is a top view of a typical diesel powered semi-tractor having a pair of tandem fuel tanks.

Diesel powered over the road trucks usually travel long distances and must carry considerable amounts of fuel. A typical semi-tractor 10 is shown in FIG. 1. The semi-tractor has a pair of large fuel tanks 12 and 14 mounted in tandem on the sides of the truck.

Figure 2:
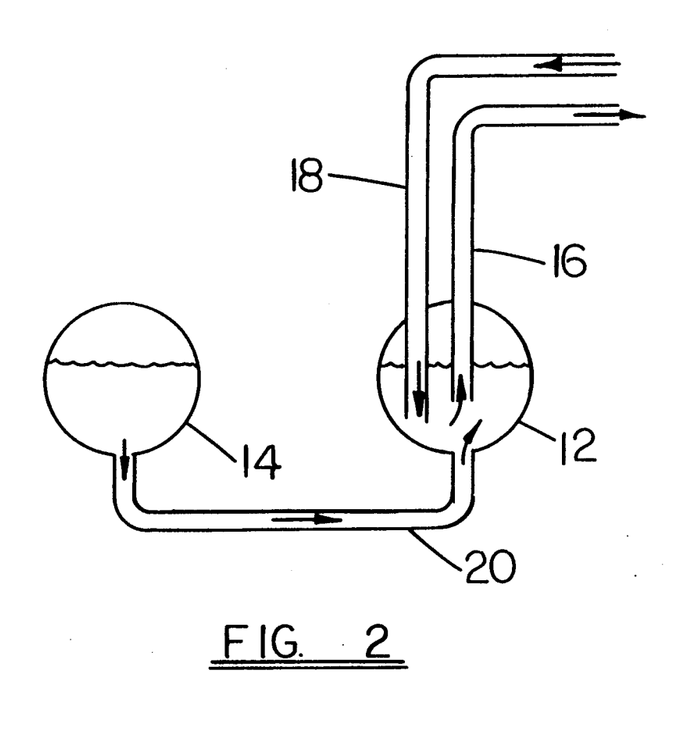
FIG. 2 is a schematic view of a relevant portion of a prior art fuel delivery system for a diesel truck.

In the typical prior art fuel system shown schematically in FIG. 2, fuel is drawn from a lower portion of a first fuel tank 12 through a fuel delivery line 16. Fuel delivery line 16 is connected to the remainder of the truck fuel system which is not shown. The typical fuel system may include such items as a fuel filter/water separator, fuel pump, fuel rail, and eventually the fuel injectors that deliver the fuel into the cylinders of the engine. Many diesel engines also have an overflow line 18, through which fuel which has been delivered to the fuel rail but which has not been consumed by the engine, is returned to the fuel tanks. Because the fuel has absorbed energy due to the action of the fuel pump, the returning fuel is typically much warmer than the fuel in the tanks.

The fuel level in tanks 12 and 14 is typically equalized by a bottom connecting line 20. Connecting line 20 extends below the bottom portions of the fuel tanks. It is desirable to keep the fuel in both tanks at the same level to maintain an equal weight distribution on the truck as well as to ensure all available fuel is used.

Connecting the fuel tanks through a bottom connecting line has disadvantages. First, because the line connects the tank bottoms and extends below the lower portions of the tanks, contaminants, such as water, can collect in the connecting line. If the water freezes, the connecting line may be blocked. Another potential problem is that if the connecting line is accidentally broken, all the fuel in both fuel tanks may be lost.

Another drawback associated with typical prior art fuel systems is that the fuel returning from the engine via overflow line 18 can become very warm during the summer months. This can increase the temperature in fuel tank 12. The fuel being delivered to the engine may get so hot that it will no longer burn efficiently. In addition, hot fuel may interfere with the operation of electronic fuel control systems which are common on many new trucks.

Another problem with conventional fuel systems is that diesel fuel naturally becomes thick and viscous in cold temperatures. When the truck is operated in winter conditions, wax crystals may form in the diesel fuel making it difficult to achieve fuel flow to the engine. Fuel heating devices are often employed during winter months to maintain fuel flow from the fuel tanks to the engine. These devices add to the cost of the truck.

Thus there exists a need for a fuel system for a diesel truck that avoids the problems associated with clogging of bottom connecting lines between the fuel tanks, loss of fuel due to line breakage, overheating of fuel in summer and the need to employ special fuel heating devices in winter.

DISCLOSURE OF INVENTION

It is an object of the present invention to provide a fuel system for a diesel truck that reduces the probability of clogging the line which equalizes levels between fuel tanks.

It is a further object of the present invention to provide a fuel system for a diesel truck that reduces the probability of spillage in the event of breakage of the line connecting the fuel tanks.

It is a further object of the present invention to provide a fuel system for a diesel truck that helps to maintain the fuel in a warm and fluid condition in cold weather.

It is a further object of the present invention to provide a fuel system for a diesel truck that helps to keep the diesel fuel from becoming too warm when the truck is operated in hot weather.

Further objects of the present invention will be made apparent in the following Best Modes for Carrying Out Invention and the appended claims.

The foregoing objects are accomplished by a fuel system for a diesel truck which has first and second fuel tanks mounted in tandem. Fuel is drawn from the interior of the first fuel tank through a fuel delivery line which is in fluid communication with the fuel injectors of the engine.

A siphon line which serves as fluid passage means extends from a lower portion of the second fuel tank to a lower portion of the first fuel tank. The siphon line extends to a level vertically above the upper portions of both fuel tanks.

A manually operated priming pump is connected to the siphon line and is used to draw fuel from an upper portion thereof. The pump is operated to extract air and fuel from the siphon line until the siphon line is completely filled with liquid fuel. The liquid and air drawn from the siphon line is delivered back into one of the fuel tanks through a conduit. A sight glass adjacent to the pump enables an operator to determine when all of the air has been exhausted from the siphon line.

An overflow line returns unused fuel from the fuel rail of the engine. The overflow line is connected to a three-way control valve. The three-way control valve is connected to a first return line which delivers fuel to the first fuel tank and a second return line which delivers fuel to the second fuel tank. A temperature sensor mounted on the first fuel tank senses the temperature of the fuel therein and is connected to the three-way control valve. The control valve directs fuel from the overflow line to the first or second fuel tanks depending on the temperature sensed. In an alternative embodiment a self-contained, thermal valve in the overflow line directs fuel to the first or second fuel tanks depending on the temperature of the returning fuel.

In operation, the manual priming pump is used to expel all the air from the siphon line. Thereafter, as fuel is drawn from the first tank to the engine through the fuel delivery line, the fuel levels in the first and second tanks equalize as a result of flow through the siphon line. Because the siphon line extends vertically above both fuel tanks, contaminants do not collect therein. In addition, if the siphon line is inadvertently broken, no fuel will be lost from the tanks.

During winter conditions when the fuel is cold, the temperature sensor in the first tank causes the three-way control valve to direct fuel from the overflow line to the first tank. Because the fuel returning through the overflow line is warm, the fuel in the first tank is heated. This lowers the viscosity of the fuel and helps to keep it flowing to the engine.

In summer conditions when the fuel in the first tank has become so warm that a further increase in temperature may cause problems, the three-way control valve directs the hot fuel in the overflow line to the second tank. The excess heat in the returning fuel is largely dissipated in the second tank and by passage through the siphon line. This maintains the fuel in the first tank, which is being delivered to the engine, within an acceptable temperature range.

BEST MODES FOR CARRYING OUT INVENTION

Figure 3:
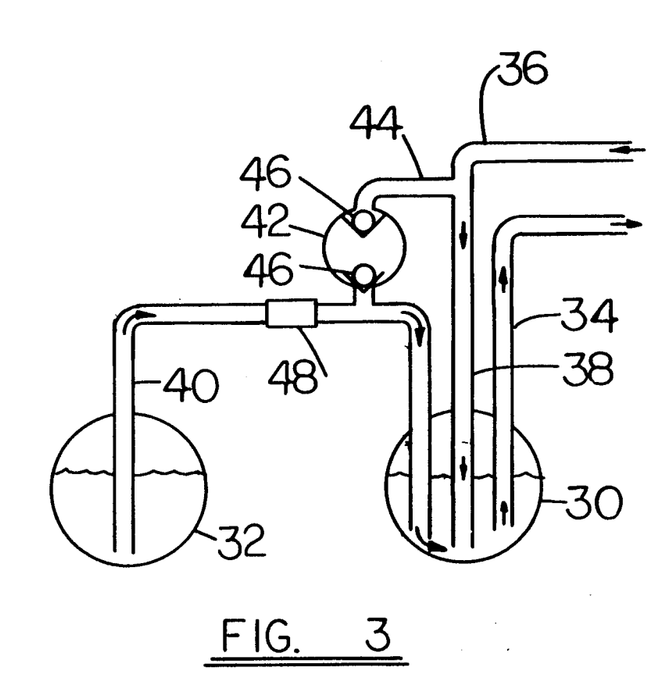
FIG. 3 is a schematic view of a first embodiment of the fuel system of the present invention which serves to equalize the fuel levels between the fuel tanks.

Referring now to the drawings, a first embodiment of the fuel system for a diesel truck of the present invention is shown schematically in FIG. 3. The system includes a first fuel tank 30 and a second fuel tank 32. Fuel is shown schematically in each tank at the same level. A fuel delivery line 34 extends from a lower portion of the first fuel tank. The fuel delivery line supplies fuel to the remainder of the truck fuel system. The remainder of the truck fuel system includes such items as a fuel filter/water separator, fuel pump, fuel rail and fuel injectors which deliver diesel fuel into the cylinders of the diesel engine. As these items are well known to those skilled in the art, they are not described herein.

An overflow line 36 returns fuel that has been delivered to the fuel rail but which is not injected into the cylinders of the engine. Such overflow lines are standard on diesel engines. Overflow line 36 is connected to a first fuel return line 38 which extends into a lower portion of first fuel tank 30

A siphon line 40 which serves as fluid passage means, extends between a lower portion of second fuel tank 32 and a lower portion of first fuel tank 30. The siphon line extends vertically above the upper portions of both fuel tanks. A manual priming pump 42 is connected to siphon line 40. Pump 42 is connected to return line 38 through a conduit 44. Check valves 46 are positioned on each side of priming pump 42 to insure that fluid may only flow out of siphon line 42 through the pump, and no fluid may flow in the opposite direction. A sight glass 48 is positioned in the siphon line 40 adjacent the pump. In the preferred form of the invention, the siphon line has a 1" I.D. and the priming pump has a displacement volume of 12 cubic centimeters per stroke. In other embodiments other sizes may be used depending on the system, and electric or other types of pumps may be substituted for the manual priming pump.

In operation, pump 42 is used to draw fluid from siphon line 40. As the pump is located in an upper portion of the siphon line, any air in the line is drawn upward along with fuel. The air and fuel is passed through conduit 44 back into the first fuel tank. When the siphon line is filled with fuel, the absence of air bubbles can be detected through the sight glass and the pumping action may be stopped.

With siphon line 40 filled with fuel, the level of fuel in the tanks will equalize as the result of flow by siphon action through the siphon line. However, because the siphon line extends above both fuel tanks, contaminants including water, which are heavier than the diesel fuel will not collect or freeze therein and clog the line. In addition, if the siphon line is broken, no fuel will spill.

As shown schematically in FIG. 3, in the preferred form of the invention, the siphon line 40 has its opening lower in the fuel tanks than the opening of fuel delivery line 34 that supplies fuel to the engine. As a result, no air will be introduced into the siphon line even if the truck is run out of fuel.

Figure 4:
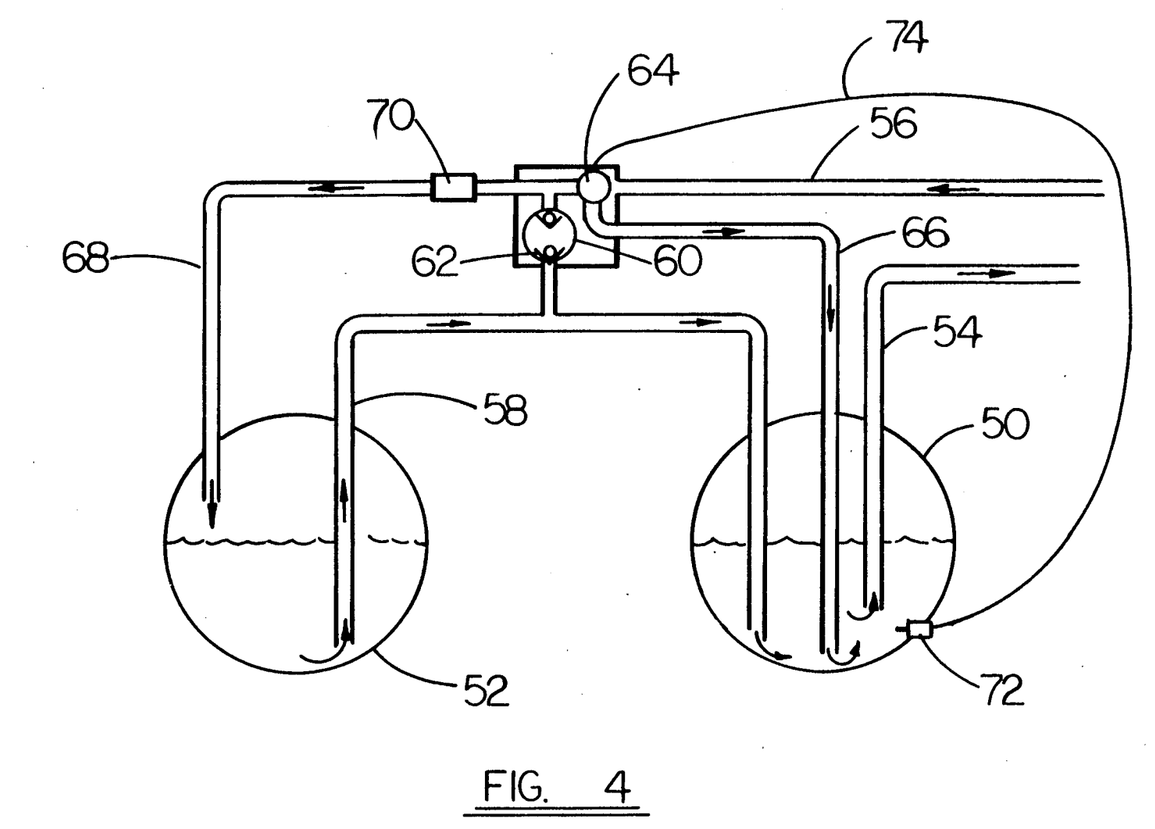
FIG. 4 is an alternative embodiment of the fuel system of the present invention with a fuel temperature controlling feature.

A second embodiment of the present invention is shown in FIG. 4. The second embodiment like the first, has a first fuel tank 50 and a second fuel tank 52. A fuel delivery line 54 delivers fuel from the first fuel tank to the engine and an overflow line 56 delivers fuel back from the fuel injection system.

A siphon line 58 extends between the lower portions of the first and second fuel tanks. A manual priming pump 60 is connected to the siphon line. Check valves 62 on each side of the priming pump insure that fluid can only flow in one direction out of the siphon line through the pump.

Overflow line 56 is connected to a three-way control valve 64 which is shown schematically in a common housing with the priming pump. Three-way control valve 64 is connected to a first return line 66 which extends from the valve to a lower portion of first fuel tank 50. A second return line 68 extends from the control valve to an upper portion of second fuel tank 52. Second return line 68 also includes a sight glass 70. A temperature sensor 72 is mounted in first fuel tank 50. Sensor 72 senses the temperature of the fuel in the fuel tank and is electrically connected by a cable 74 to the three-way control valve 64. The three-way control valve operates to change its condition depending on the temperature of the fuel detected by sensor 72. In a first condition, the control valve delivers fuel from overflow line 56 to first return line 66 and in a second condition directs the fuel from the overflow line to the second return line 68.

In operation of the second embodiment of the fuel system of the present invention, manual priming pump 60 is used to fill siphon line 58 with fuel to displace all air therefrom. The fluid pumped from the siphon line is conducted to second return line 68 and back into the second fuel tank. A sight glass 70 enables the operator to detect when all of the air has been expelled from the siphon line.

Fuel is drawn from first tank 5 to the engine and fuel that is not consumed is returned in the overflow line 56. The returning fuel is warmer than the fuel being delivered because of the fuel absorbs energy as the result of the mechanical work done by the fuel pump.

In cold weather conditions, sensor 72 detects that the fuel in the first tank is cold. In response to detecting the cold temperature of the fuel, control valve 64 directs the warm returning fuel in overflow line 56 into first return line 66. The first return line delivers the warm fuel to the bottom of the first fuel tank. This results in mixing of the fuel in the first tank as well as warming of the fuel which reduces its viscosity. This reduces the formation of wax crystals and helps to keep the fuel from becoming too thick to flow through the lines and filters to the engine.

In summer, the fuel in the tanks becomes warm. If the fuel becomes too hot, it may no longer burn efficiently or may interfere with the operation of the electronic fuel control system of the engine. When temperature sensor 72 detects a temperature that approaches the undesirable range (in the preferred embodiment 80°-90° F.), three-way control valve 64 changes its condition so that the warmer fuel, in overflow line 56 is directed to the second fuel tank through second return line 68.

Second return line 68 opens into an upper portion of the second tank so that the heat in the fuel is conducted to the air in the tank as well as to the fuel in the second tank. The heat carried by the returning fuel is dissipated while it is resident in the second tank and as it passes through the siphon line into the first tank. As a result, the temperature of the fuel being delivered to the engine from the first tank remains sufficiently cool to achieve proper engine operation.

Figure 5:
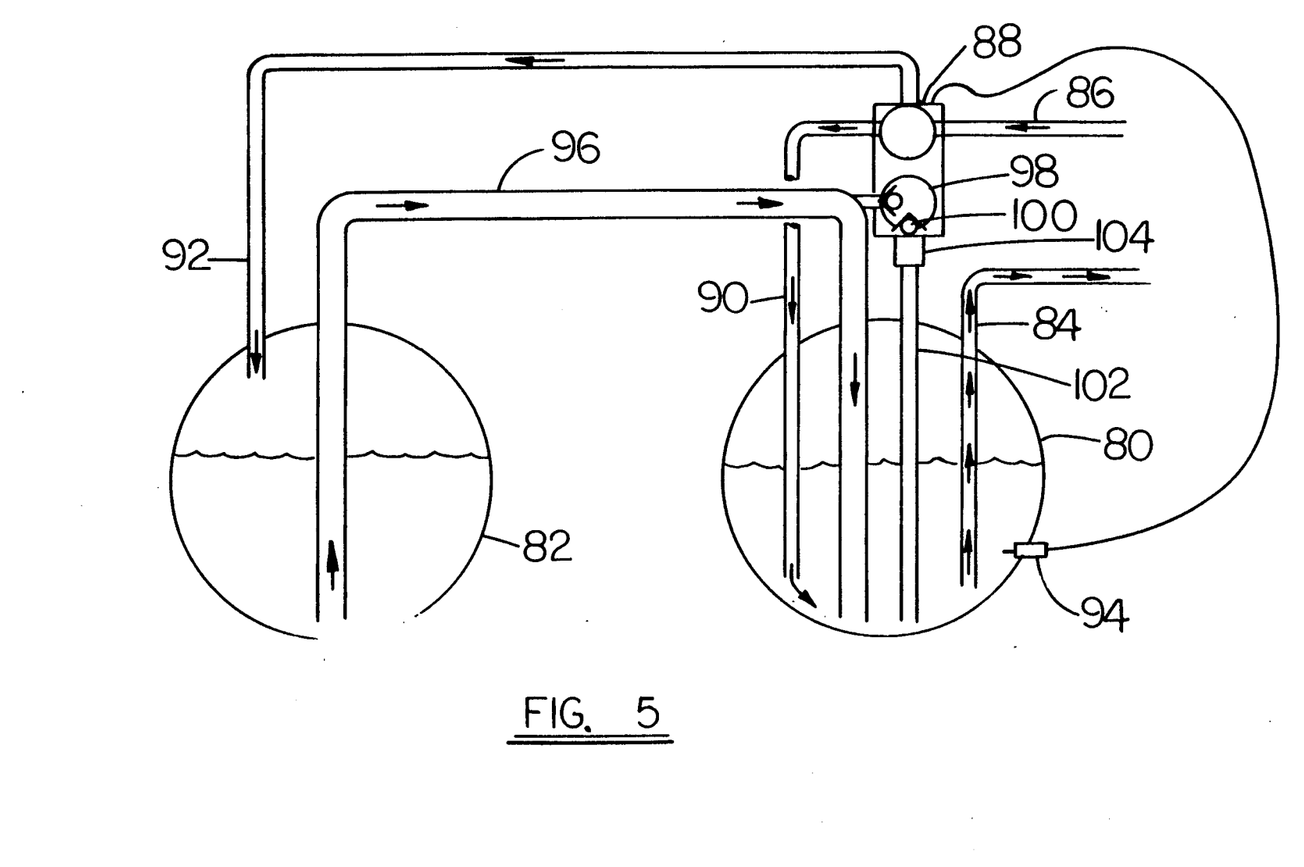
FIG. 5 is a further alternative embodiment of the fuel system of the present invention.

A third embodiment of the invention is shown in FIG. 5. Like the other embodiments, this embodiment includes a first fuel tank 80 and a second fuel tank 82. A fuel delivery line 84 delivers fuel to the engine, and an overflow line 86 returns warmed fuel from the fuel injection system. This embodiment also has a three-way control valve 88. Control valve 88 is connected to a first return line 90 which is connected to the first fuel tank, and a second return line 92 which is connected to the second fuel tank. The temperature sensor 94 detects the temperature of the fuel in the first tank, and as in the other embodiment, control valve 88 directs fuel returning in the overflow line to either the first or second fuel tank depending on the temperature of the fuel.

A siphon line 94 extends between the lower portions of the first and second fuel tanks. A manual priming pump 98 is connected to the siphon line. Check valves 100 insure that no fluid may flow into the siphon line through the pump.

The outlet of the pump is connected to a small siphon vent line 102. Siphon vent line 102 is smaller than the siphon line and extends to a level in the first tank which is at least as low as the opening to the siphon line. In the preferred form of this embodiment, the siphon line has approximately 1" I.D. and the siphon vent line is much smaller having approximately ¼ inch I.D. A sight glass 104 is positioned at the top of the siphon vent line and enables the operator to determine when all of the air has been pumped from the siphon vent line through the pump and out of the siphon vent line.

The third embodiment operates in the same manner as the second embodiment except that fluid pumped from the siphon line is expelled through small siphon vent line 102 rather than one of the return lines. The advantage of this embodiment is that because the siphon vent line is small so that the pumping velocity will carry air vertically down and out into the tank. This insures that it is fully filled with fuel at the completion of the priming operation. As a result, even if the check valves surrounding the priming pump fail, no air will enter the siphon line. This adds to the reliability of the system for equalizing the levels between the tanks.

In the embodiments discussed the three-way control valves have been described as valves which direct fuel to either the first fuel tank or the second fuel tank depending on temperature of the fuel. It is to be understood that valves which divide the flow of warmed fuel between the two tanks depending on temperature may also be used. Such alternative valves may be of various types which are responsive to temperature, which are well known to those skilled in the art.

Other embodiments of the invention may be constructed which avoid the use of a temperature sensor in the fuel tank. It has been found that the temperature of the warmed fuel in the overflow line is usually directly related to the temperature of the fuel being delivered in the first tank. As a result, the temperature sensor for control of the valve may be installed in the overflow line.

Figure 6:
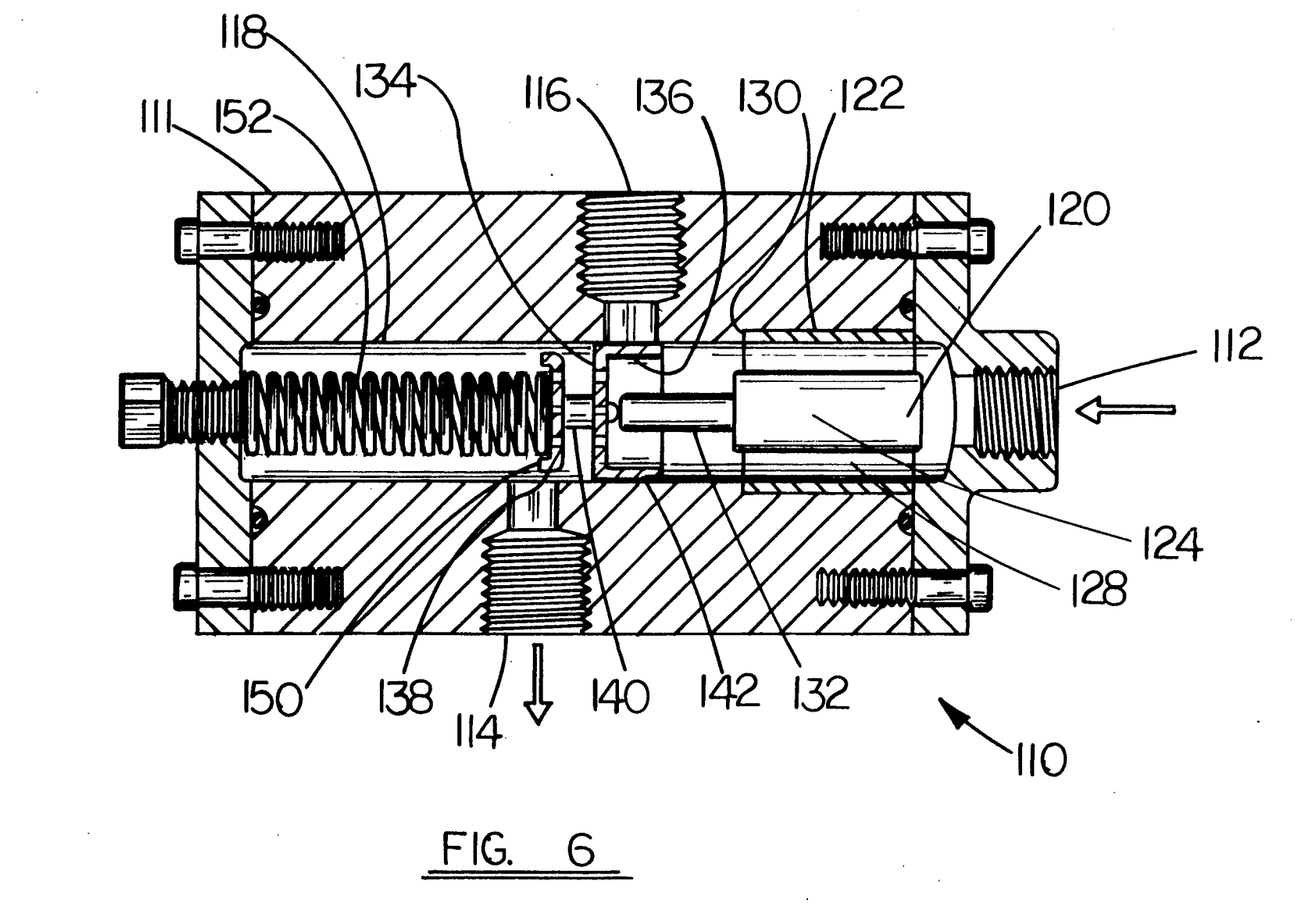
FIG. 6 is a cross sectional view of an alternative three-way thermostatic control valve for use in the system of the present invention, the valve being shown in a first condition.

Other embodiments of the invention may be even further simplified by using a control valve with a self-contained temperature sensor. Such a valve is shown in FIG. 6 and is generally indicated 110. Control valve 110 has a body 111 which includes an inlet 112 for connection to the overflow line. Valve 110 also has a first outlet 114 for connection to the first return line which returns fuel to the first return line which returns fuel to the first fuel tank, as well as a second outlet 116 for connection to the second return line which returns fuel to the second fuel tank.

Figure 8:
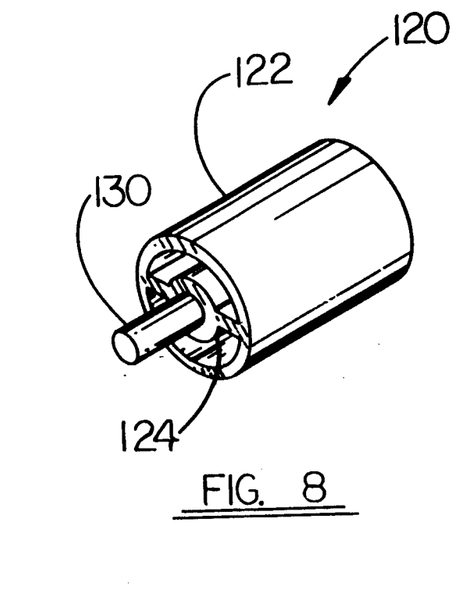
FIG. 8 is a perspective view of a thermostatic actuator of the valve shown in FIG. 6.

Body 111 includes a bore 118 which extends through the valve. Bore 118 is in fluid connection with the inlet and the first and second outlets. A thermostatic actuator 120 is positioned in the bore adjacent to the inlet. As shown in FIG. 8, thermostatic actuator 120 has a cylindrical outer housing 122 and a central cylindrical body 124. The cylindrical body is held centrally in housing 122 by a pair of supports 126. As a result, a flow passage 128 is formed through the thermostatic actuator around cylindrical body 124. A step 130 in bore 118 is used to position the housing of the thermostatic actuator in the bore.

A rod 132 extends from cylindrical body 124 of the thermostatic actuator. The cylindrical body contains a material that expands with increasing temperature. As a result, rod 132 extends further from the actuator as the temperature sensed by the actuator increases. In the embodiment of the valve described, the actuator and plunger assembly are a commercially available "Power Pill" from the Robertshaw Controls Company and contains a thermally expansible wax. Of course, other types of thermally expansible materials may be used.

Figure 9:
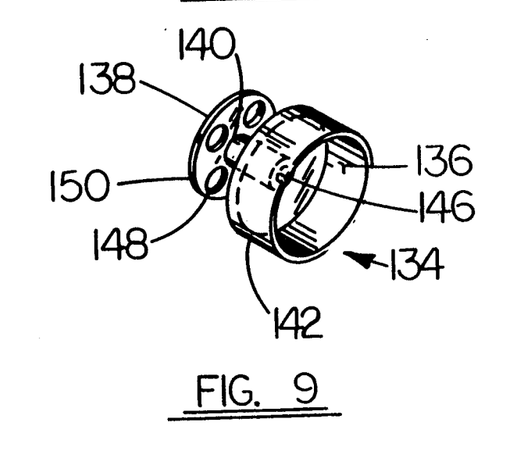
FIG. 9 is a perspective view of the poppet assembly of the valve shown in FIG. 6.
Figure 10:
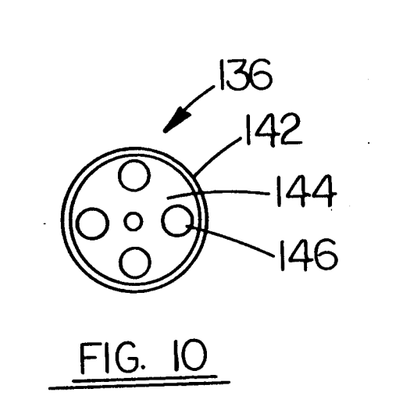
FIG. 10 is a plan view of the poppet assembly of the valve shown in FIG. 6.

A plunger assembly 134 is positioned in bore 118. Plunger assembly 134 includes a cylindrical valve disc 136 and spring retaining plate 138 which are held together by a spacer rivet 140. As shown in FIGS. 9 and 10, valve disc 136 includes a side wall 142 which extends adjacent to the wall of the bore but is sized so that the valve disc is moveable therein. Valve disc 136 also includes a back plate 144 which includes a plurality of holes 146 for enabling fuel to flow through the valve disc.

Figure 7:
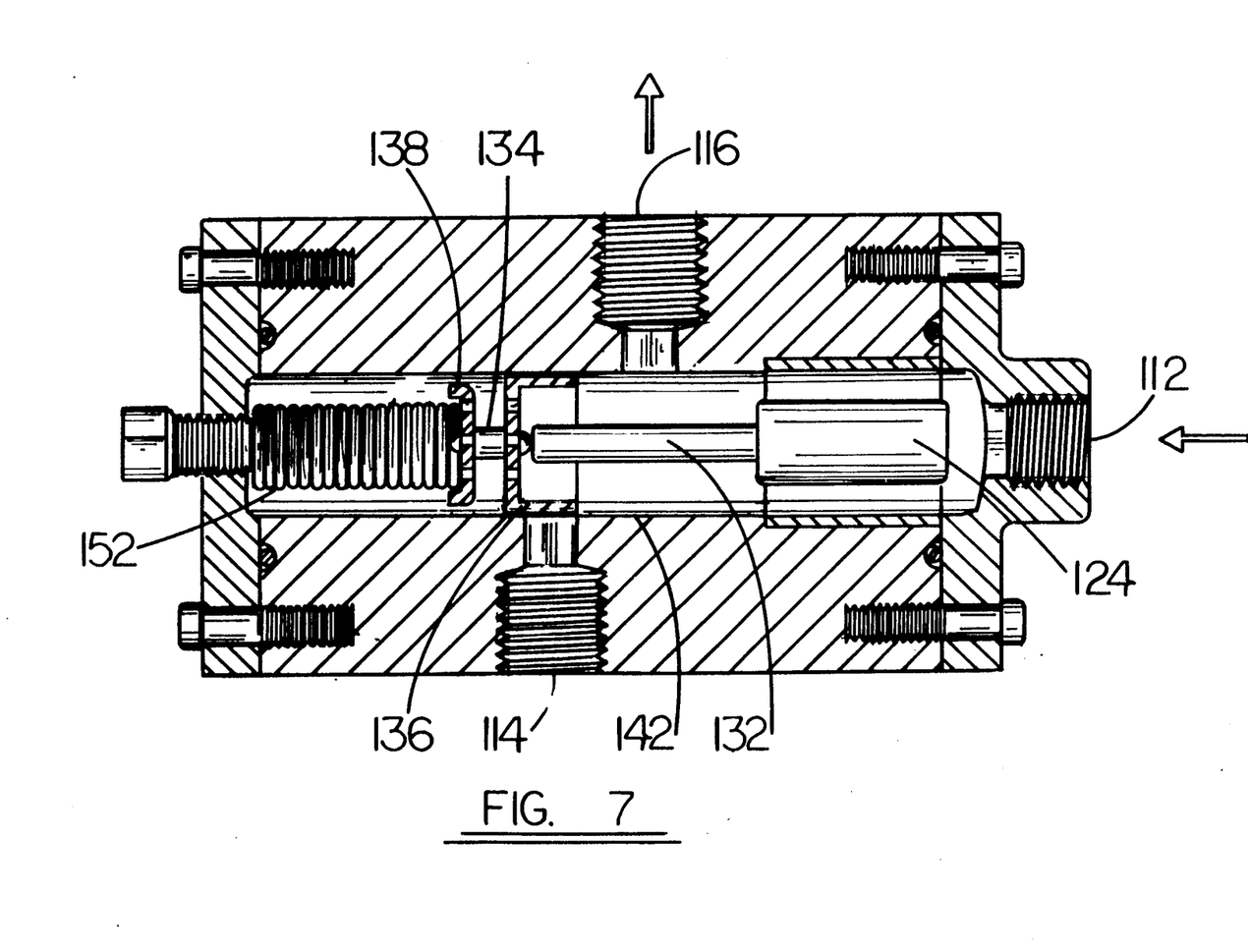
FIG. 7 is a cross sectional view of the valve shown in FIG. 6, in a second condition.

The spring retaining plate 138 also has a plurality of holes 148 which extend therethrough. Spring retaining plate 138 also has an in turned edge 150. As shown in FIGS. 6 and 7, in turned edge 150 helps to position a compression spring 152 which biases the plunger assembly to the right as shown in the figures. The spacer rivet 140 is staked to the valve disc and the spring retainer plate and holds them together in spaced relation.

In operation of control valve 110, fuel in the overflow line enters the valve through inlet 112. From the inlet fuel passes into the bore 118 and flows through the flow passage 128 in the thermostatic actuator 120. When the fuel is relatively cold, the rod 132 is fully retracted into the cylindrical body 124 of the actuator as shown in FIG. 6.

The moveable plunger assembly 134 abuts rod 132 due to the force applied by spring 152. In the first condition of the valve shown in FIG. 6, the rod is retracted and the side wall 142 of valve disc blocks the outlet from the bore which leads to second outlet 116. As a result, all of the fuel passes through the hole 146 in the valve disc, around and through the spring retaining plate 138, and flows out of the bore through first outlet 114. When the fuel in the overflow line is relatively cool, all of the fuel in the overflow line is directed to the first return line and into the first tank.

When the fuel in the first fuel tank gets warm, the fuel in the overflow line gets even warmer. The warm fuel flowing through the valve causes plunger rod 132 to fully extend from the actuator against the force of spring 152 as shown in FIG. 7. In this second condition, side wall 132 of the valve disc fully blocks flow to first outlet 114. All the fuel goes out of the valve through second outlet 116 and is directed to the second fuel tank where the excess heat in the fuel is dissipated. When the fuel again cools, spring 152 pushes the rod back into the actuator and moves the plunger assembly back toward the first condition.

The construction of valve 110 has the advantage that between the extremes of temperature, the valve divides the flow from the overflow line between the first and second fuel tanks according to temperature. As long as the fuel is fairly cool, most of the returning fuel will be directed back to the first tank. As the fuel warms more flow will gradually be directed to the second tank. This avoids radical shifts in fuel temperatures which is desirable for efficient engine operation. The valve also provides for a compact system and avoids the use of a separate temperature probe and complex valve control mechanism. This increases reliability and reduces costs.

Although the embodiments discussed herein involve two (2) fuel tanks, the invention may be adapted for use in systems which have more tanks. Some standard trucks now have four fuel tanks. Additional syphon and return lines could be used by those skilled in the art to utilize the invention on such trucks.

Thus, the new fuel system for diesel trucks of the present invention achieves the above stated objectives; eliminates difficulties encountered in the use of prior systems; solves problems and attains the desirable results described herein.

In the foregoing description, certain terms have been used for brevity, clarity and understanding, however, no unnecessary limitations are to be implied therefrom because such terms are used for descriptive purposes and are intended to be broadly construed. Moreover, the descriptions and illustrations given are by way of examples and the invention is not limited to the exact details shown or described.

Having described the features, discoveries and principles of the invention, the manner in which is utilized, and the advantages and useful results obtained; the new and useful structures, devices, elements, arrangements, parts, combinations, systems, equipment, operations, methods and relationships are set forth in the appended claims.

I claim:

1. A fuel system for a vehicle which includes an engine which consumes fuel, said fuel housed in a plurality of tanks, comprising:
   a first fuel tank, having a first interior portion, said first interior portion having a first upper portion and a first lower portion;
   conduit means for conducting fuel from said first interior portion of said first tank to said engine;
   a second fuel tank disposed on said vehicle from said first tank, said second fuel tank having a second interior portion, said second interior portion having a second upper portion and a second lower portion, said first and second upper portions generally the same vertical elevation;
   first fluid passage means extending between said first and second lower portions, said first fluid passage means extending vertically above said upper portions of said fuel tanks; and
   pumping means for removing air from said first fluid passage means, and wherein said first fluid passage means is filled with fuel and fuel is enabled to be siphoned from said second fuel tank to said first fuel tank and vice versa, through said first fluid passage means to equalize the levels in said first and second tanks.

2. The fuel system according to claim 1 and further comprising:
   an overflow line for returning fuel delivered to said engine and not used therein;
   a first return line in connection with said first interior portion of said first fuel tank; and
   wherein said overflow line is in fluid connection with said first return line and said pumping means pumps fuel from said first fluid passage means to said first return line to remove air therefrom.

3. The fuel system according to claim 2 and further comprising check valve means in operative connection with said pumping means to prevent fluid flow into said first fluid conduit means through said pumping means.

4. The fuel system according to claim 3 and further comprising:
   a second return line in connection with said second interior portion of said second fuel tank;
   valve means in operative connection with said first return line, second return line and said overflow line for selectively directing fuel flow from said overflow line to said first or second return lines; and
   temperature sensing means in operative connection with said valve means for sensing temperature of said fuel, said valve means directing fuel therethrough to said first or second return lines responsive to the temperature thereof.

5. The fuel system according to claim 4 wherein said valve means is operative to direct fuel to said first return line when said fuel is below a first temperature and to said second return line when fuel is above said first temperature.

6. The fuel system according to claim 5 wherein said first return line delivers fuel to said first lower portion of said first fuel tank, and said second return line delivers fuel to said second upper portion of said second fuel tank.

7. The fuel system according to claim 1 and further comprising:
a priming vent line in operative connection with said pumping means, said priming vent line extending to said first lower portion of said first tank, said pumping means pumping fuel from said first fluid passage means to said first lower portion through said priming vent line;
whereby entry of air to said first fluid passage means is prevented during a malfunction of said check valve means.

8. The fuel system according to claim 7 wherein said priming vent line further includes a top portion and said top portion includes viewing means for viewing air in said priming vent line.

9. The fuel system according to claim 8 and further comprising:
an overflow line for returning fuel delivered to said engine and not used therein;
a first return line in connection with said first interior portion of said first fuel tank; and
wherein said overflow line is in fluid connection with said first return line.

10. The fuel system according to claim 9 and further comprising check valve means in operative connection with said pumping means to prevent fluid flow into said first fluid conduit means through said pumping means.

11. The fuel system according to claim 10 and further comprising:
a second return line in connection with said second interior portion of said second fuel tank;
valve means in operative connection with said first return line, second return line and said overflow line for selectively directing fuel flow from said overflow line to said first or second return lines; and
temperature sensing means in operative connection with said valve means for sensing temperature of said fuel, said valve means directing fuel therethrough to said first or second return lines responsive to the temperature thereof.

12. The fuel system according to claim 11 wherein said valve means is operative to direct fuel to said first return line when said fuel is below a first temperature and to said second return line when fuel is above said first temperature.

13. The fuel system according to claim 12 wherein said first return line delivers fuel to said first lower portion of said first fuel tank, and said second return line delivers fuel to said second upper portion of said second fuel tank.

14. The fuel system according to claim 13 wherein said temperature sensing means senses temperature in said first fuel tank.

15. The fuel system according to claim 14 wherein said valve means divides fuel flow from said overflow line between said first and second return lines responsive to said temperature sensing means.

16. The fuel system according to claim 13 wherein said temperature sensing means senses temperature of said fuel in said overflow line.

17. The fuel system according the claim 16 wherein said temperature sensing means comprises thermally responsive means in said valve adjacent an inlet thereto from said overflow line for changing the condition of said valve responsive to the fuel temperature adjacent said inlet.

* * * * *